US010223126B2

(12) United States Patent
Thompto (10) Patent No.: US 10,223,126 B2
(45) Date of Patent: *Mar. 5, 2019

(54) OUT-OF-ORDER PROCESSOR AND METHOD FOR BACK TO BACK INSTRUCTION ISSUE (71) Applicant: International Business Machines Corporation, Armonk, NY (US)

(72) Inventor: Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/399,938

(22) Filed: Jan. 6, 2017

(65) Prior Publication Data

US 2018/0196677 A1  Jul. 12, 2018

(51) Int. Cl.
*G06F 9/38* (2018.01)
*G06F 9/30* (2018.01)

(52) U.S. Cl.
CPC ........ *G06F 9/3855* (2013.01); *G06F 9/30021* (2013.01); *G06F 9/3838* (2013.01)

(58) Field of Classification Search
CPC .............................. G06F 9/3855; G06F 9/3838
See application file for complete search history.

(56) References Cited

U.S. PATENT DOCUMENTS

| 5,802,386 | A | 9/1998 | Kahle et al. | |
|---|---|---|---|---|
| 6,308,260 | B1* | 10/2001 | Le | G06F 9/3836 712/215 |
| 7,328,330 | B2 | 2/2008 | Abernathy et al. | |
| 7,418,578 | B2 | 8/2008 | Nguyen et al. | |
| 7,454,747 | B2 | 11/2008 | Bliss | |
| 7,669,038 | B2 | 2/2010 | Burky et al. | |
| 2007/0250687 | A1* | 10/2007 | Burky | G06F 9/3836 712/214 |
| 2012/0023314 | A1* | 1/2012 | Crum | G06F 9/3826 712/214 |

OTHER PUBLICATIONS

Buyuktosunoglu et al, An oldest-first selection logic implementation for non-compacting issue queues, 2002, IEEE, 0-7803-7494-0/02, pp. 31-35.*
Palacharla et al, Complexity-effective superscalar processors, 1997, ACM, 0-89791-901-7/97/0006, pp. 206-218.*
Thompto, Brian W., "Out-of-Order Processor and Method for Back-to-Back Instruction Issue" U.S. Appl. No. 15/424,682, filed Feb. 3, 2017, 25 pages.

(Continued)

Primary Examiner — Jyoti Mehta
(74) Attorney, Agent, or Firm — Martin & Associates, LLC; Derek P. Martin (57) ABSTRACT An out-of-order (OOO) processor includes ready logic that provides a signal indicating an instruction is ready when all operands for the instruction are ready, or when all operands are either ready or are marked back-to-back to a current instruction. By marking a second instruction that consumes an operand as ready when it is back-to-back with a first instruction that produces the operand, but the first instruction has not yet produced the operand, latency due to missed cycles in executing back-to-back instructions is minimized.

6 Claims, 7 Drawing Sheets (56) References Cited

OTHER PUBLICATIONS

Appendix P—List of IBM Patents or Patent Applications Treated as Related, dated Mar. 1, 2017, 2 pages.
Keckler et al., "Architecture and Implementation of the TRIPS Processor", Unique Chips and Systems, edited by John et al., pp. 1-40, 2008.
Sassone, Peter G., Characterization and Avoidance of Critical Pipeline Structures in Aggressive Superscalar Processors, Thesis for Ph.D, School of Electrical and Computer Engineering, Georgia Institute of Technology, Aug. 2005. 153 pages.
Sinharoy et al., "IBM POWER7 multicore server processor", IBM Journal of Research and Development, vol. 55, No. 3, Paper 1, May/Jun. 2011. 29 pages.
Tseng, Jessica Hui-Chun, "Banked Microarchitectures for Complexisy-Effective Superscalar Microprocessors", Thesis for Ph.D, Department of Electrical Engineering and Computer Science, Massachusetts INstitute of Technology, May 2006. 99 pages.

\* cited by examiner

OUT-OF-ORDER PROCESSOR AND METHOD FOR BACK TO BACK INSTRUCTION ISSUE

BACKGROUND

1. Technical Field

This disclosure generally relates to processors, and more specifically relates to out-of-order (OOO) processors.

2. Background Art

Processor architectures have become very sophisticated. Out-of-order (OOO) processors include multiple instruction execution pipelines and processing queues that process multiple instructions in parallel. An instruction sequencing unit in an OOO processor takes dispatched instructions and checks their dependencies to see if all older instructions with respect to a current instruction have delivered, or may predictably soon deliver, results of these older instructions that are needed before the current instruction can execute properly. When all dependencies have been satisfied, the instruction is ready to issue, and is issued as soon as possible, even when the instruction occurs in the code after other instructions that are still being processed. Because instructions can be issued out of order when compared to their order in the computer program, this type of processor is referred to in the art as an out-of-order (OOO) processor.

An Issue Queue in an OOO processor selects the next instruction to execute in a set of pipelines. There may be more than one issue queue, each feeding one or more execution pipelines. Issue Queues track dependencies such that instructions may be issued when their source operands are ready. In high-frequency, high-performance processor designs, the communication of dependency information may lead to a lost cycle when an instruction that produces an operand value is used by the following instruction. This problem with back-to-back (B2B) instructions thus creates latency in the processor.

BRIEF SUMMARY

An out-of-order (OOO) processor includes ready logic that provides a signal indicating an instruction is ready when all operands for the instruction are ready, or when all operands are either ready or are marked back-to-back to a current instruction. By marking a second instruction that consumes an operand as ready when it is back-to-back with a first instruction that produces the operand, but the first instruction has not yet produced the operand, latency due to missed cycles in executing back-to-back instructions is minimized.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

An out-of-order (OOO) processor includes ready logic that provides a signal indicating an instruction is ready when all operands for the instruction are ready, or when all operands are either ready or are marked back-to-back to a current instruction. By marking a second instruction that consumes an operand as ready when it is back-to-back with a first instruction that produces the operand, but the first instruction has not yet produced the operand, latency due to missed cycles in executing back-to-back instructions is minimized.

Figure 1:
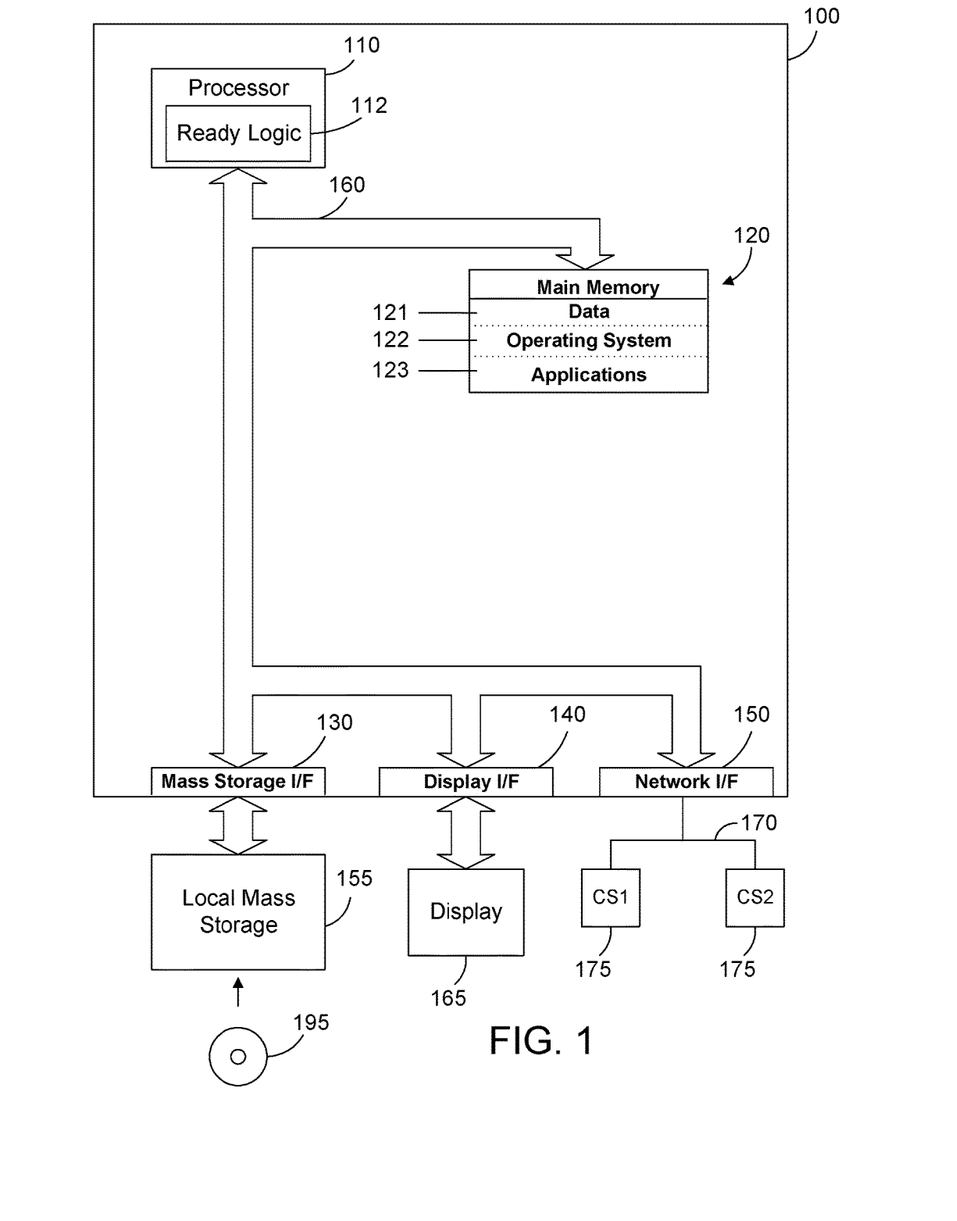
FIG. 1 is a block diagram of a computer system that includes an out-of-order (OOO) processor.

Referring to FIG. 1, a computer system 100 is one suitable implementation of a computer system that includes ready logic 112 as described in more detail below. Server computer system 100 is an IBM POWER computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is universal serial bus (USB) that reads a storage device such a thumb drive.

Main memory 120 preferably contains data 121, an operating system 122, and one or more software applications 123. Data 121 represents any data that serves as input to or output from any program in computer system 100. Operating system 122 is a multitasking operating system, such as AIX or LINUX. Applications 123 represent programs that can be run by the computer system 100.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and applications 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 is most preferably a multi-core Our-of-Order (OOO) processor in the POWER family of processors. Processor 110 includes ready logic 112, described in more detail below. Processor 110 executes program instructions stored in main memory 120. Main memory 120 stores programs and data that processor 110 may access. When computer system 100 starts up, processor 110 initially executes the program instructions that make up operating system 122. Processor 110 also executes the applications 123 under control of the operating system 122.

Although computer system 100 is shown to contain only a single processor and a single system bus, those skilled in the art will appreciate the ready logic as described herein may be practiced using a computer system that has multiple processors with their respective performance monitors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems or workstations 175 are labeled in FIG. 1 as CS1 and CS2. Computer systems 175 represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

Figure 2:
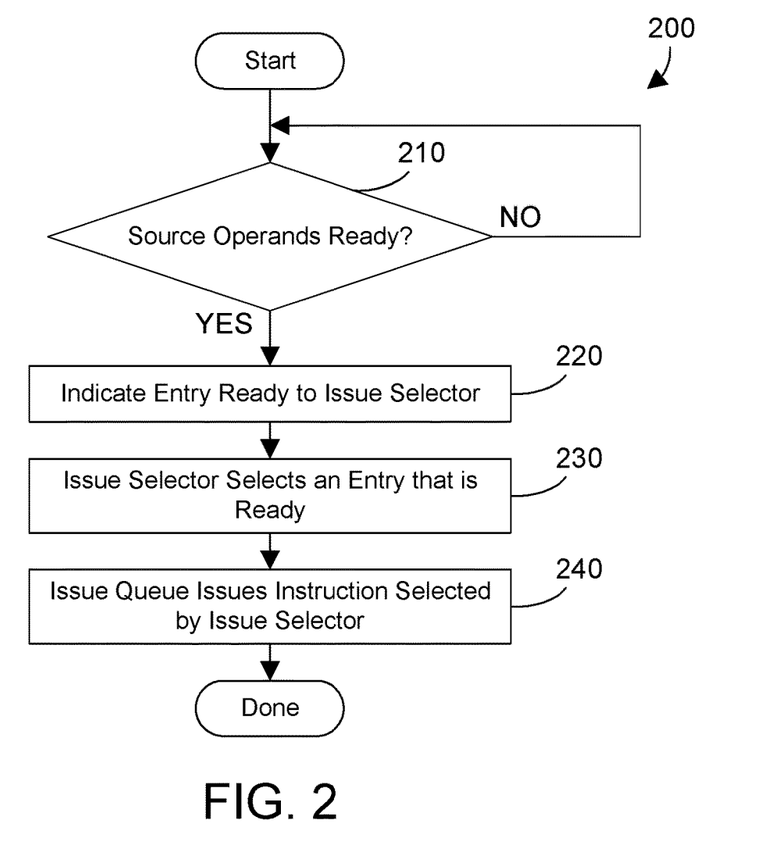
FIG. 2 is a flow diagram of a known method for an issue queue to issue an instruction.

Referring to FIG. 2, a method 200 represents steps performed by known issue queues in known OOO processors. When all source operands for an instruction are not ready (step 210=NO), method 200 loops back and waits until all source operands for an instruction are ready (step 210=YES). The entry is indicated as ready to the issue selector (step 220). In response, the issue selector selects an entry that is ready (step 230). The issue queue then issues the instruction selected by the issue selector (step 240). Method 200 is then done.

Figure 3:
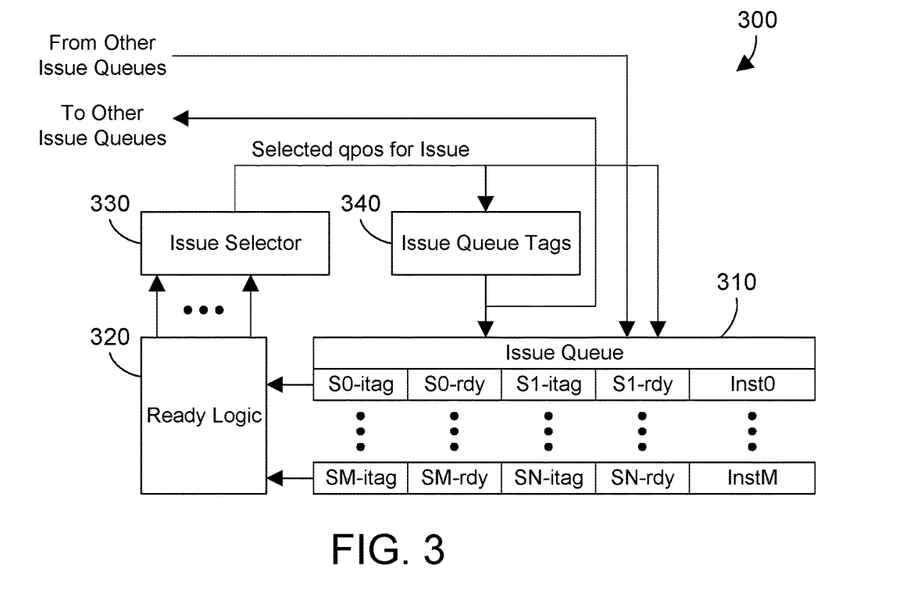
FIG. 3 is a block diagram of a portion of a known OOO processor that issues an instruction when all operands for the instruction are ready.

A very simplified block diagram of a portion of a known processor 300 is shown in FIG. 3. Processor 300 is a known OOO processor that includes the broadcast of tags to other issue queues. Tags provide a globally unique method of identifying a producer, enabling the producer wakeup condition to be sourced from various queues or producer locations in the machine. The issue queue 310 includes a plurality of entries, with each entry indicating ready state for one or more operands. In the specific example in FIG. 3, each instruction in the issue queue is shown with two operands S0 and S1. This, however, is shown by way of example, and issue queue 310 may include instructions with any suitable number of operands. Issue queue 310 in FIG. 3 includes a field S0-itag that contains the itag of a source operand S0, and also includes a field S0-rdy that indicates the source operand S0 is ready for instruction Inst0 when the S0-rdy bit is set. Similarly, the S1-itag and S1-rdy fields indicate the itag for the source operand S1 and the ready state for the S1 operand for Inst0. The issue queue 310 may include any suitable number of entries, as indicated in FIG. 3 as Inst0, . . . , InstM.

The ready logic 320 monitors the ready bits in the issue queue 310, and when an instruction in the issue queue has all of its operands ready as indicated by the respective ready bits, the ready logic 320 indicates to the issue selector 330 the instruction is ready to issue. In response, the issue selector 330 selects an entry in the issue queue that is ready via issue queue tags 340, and the instruction selected by the issue selector 330 in the issue queue tags 340 is issued. Note the itags for operands are transmitted to other issue queues and are received from other issue queues so all issue queues are aware of the state of all needed operands.

Figure 4:
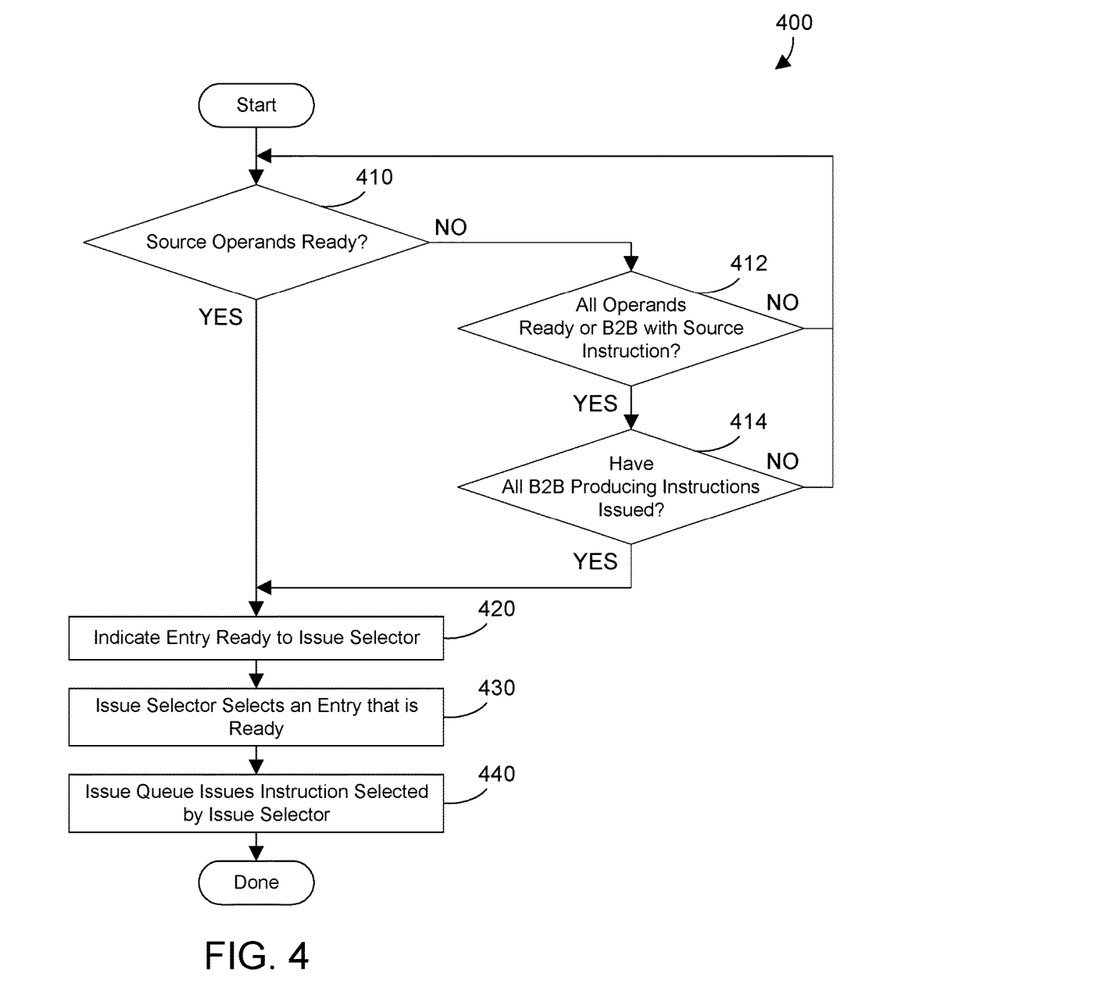
FIG. 4 is a flow diagram of a method for an issue queue to issue an instruction even when not all of the operands are ready, but when the instruction is back-to-back with an instruction that produces a needed operand.

Referring to FIG. 4, a method 400 is preferably performed by the ready logic 112 in processor 110 shown in FIG. 1. When the source operands for an instruction are all ready (step 410=YES), the entry in the issue queue is indicated as ready to the issue selector (step 420), the issue selector selects an entry in the issue queue that is ready (step 430), and the issue queue issues an instruction selected by the issue selector (step 440). This path through method 400, through steps 410=YES, 420, 430 and 440 is very similar to the prior art method 200 shown in FIG. 2. Method 400 differs from prior art method 200, however, by including a second condition for indicating an instruction is ready. If not all of the source operands are ready (step 410=NO), method 400 checks to see if all operands are either ready, or are back-to-back issuable with an instruction that is the source of the operand (step 412). If not (step 412=NO), method 400 loops back to step 410 and continues. When all operands are either ready, or are back-to-back issuable with an instruction that is the source of the operand (step 412=YES), the entry then checks if all back-to-back producing instructions for the entry have previously or are presently being issued as indicated by their queue position in similar issue queues (step 414). If not (step 414=NO), method 400 loops back to step 410 and continues. When all back-to-back producing instructions have previously issued (step 414=YES), the entry is indicated as ready to the issue selector (step 420), the issue selector selects an entry that is ready (step 430), and the issue queue issues the instruction selected by the issue selector (step 440). Method 400 thus shows two different conditions that can make and instruction ready: 1) all source operands are ready (step 410=YES); or 2) all source operands are either ready or back-to-back with an instruction that is the source of the operand (step 412=YES and step 414=YES). By recognizing an instruction that is back-to-back with an instruction that is the source of an operand will make the operand available when needed even though not all the operands for an instruction are ready, the ready logic allows minimizing empty cycles, thereby improving performance of the processor.

Figure 5:
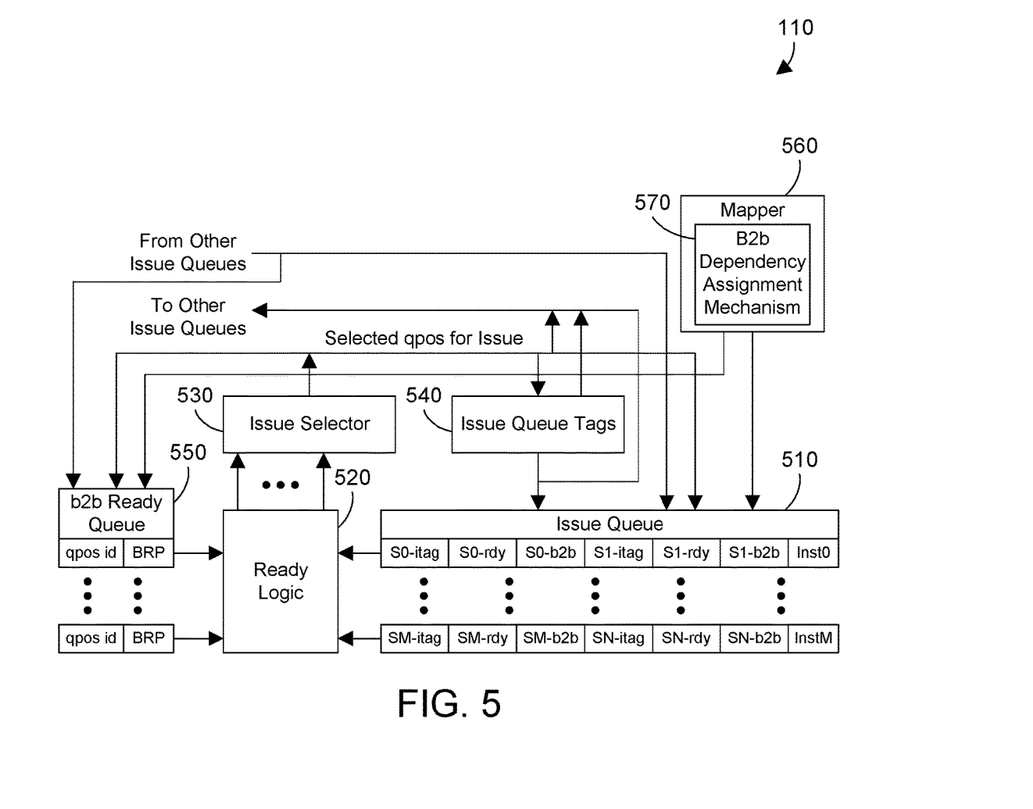
FIG. 5 is a block diagram of a portion of an out-of-order (OOO) processor that includes ready logic that can issue instructions for which not all operands are ready.

A simplified block diagram of a portion of processor 110 is shown in FIG. 5. The issue queue 510 includes multiple entries, but each entry includes an additional bit for each operand that indicates whether the operand is in an instruction that is back-to-back with the current instruction. Thus, Inst0 includes the S0-itag and S0-rdy bits, similar to the issue queue 310 in FIG. 3, but additionally includes an S0-b2b bit that indicates whether the source operand S0 is sourced by an instruction that is back-to-back with Inst0. By providing a back-to-back bit for each operand in the issue queue, the ready logic 520 can indicate an instruction is ready to the issue selector 530 when either of two conditions are satisfied, namely: 1) all source operands are ready, as indicated in the ready bits; or 2) all source operands are either ready or are back-to-back with an instruction that provides the source operand, as indicated in the b2b bits. While the ready logic 520 is shown separate from the issue queue 510, it is equally within the scope of the disclosure and claims herein for ready logic 520 to reside within the issue queue 510. The issue queue tags 540 in FIG. 5 are used in a similar manner as issue queue tags 340 shown in FIG. 3.

The processor 110 includes a Back-to-Back Ready Queue 550 and a mapper 560 that includes a back-to-back dependency assignment mechanism 570. The Back-to-Back Ready Queue 550 includes entries that have a one-to-one correspondence with the entries in the issue queue 510, are indexed by the same queue identifier, and track one or more dependent queue identifiers and queue position identifiers for instructions that source operands. The Back-to-Back Ready Queue 550 is written along with newly dispatch instructions writing the issue queue with the queue identifier and queue position identifier (qpos id in FIG. 5), and with a corresponding back-to-back result pending bit (BRP in FIG. 5) that is initially set when a queue id and queue position is assigned, but is then cleared when the queue position of the specified queue identifier is selected for issue as broadcast by the issue queue selection logic. Note the back-to-back ready queue 550 preferably snoops the queue positions broadcast to know when to clear the BRP bit for a given entry.

The mapper 560 includes a back-to-back dependency assignment mechanism 570 that tracks operand dependencies between instructions and assigns dependent itags at in-order dispatch time. This allows tracking the queue identifier that identifies which issue queue contains an instruction, along with the queue entry identifier (qpos), and whether the instruction that is the source of an operand is a single cycle instruction that is eligible for back-to-back forwarding.

Figure 6:
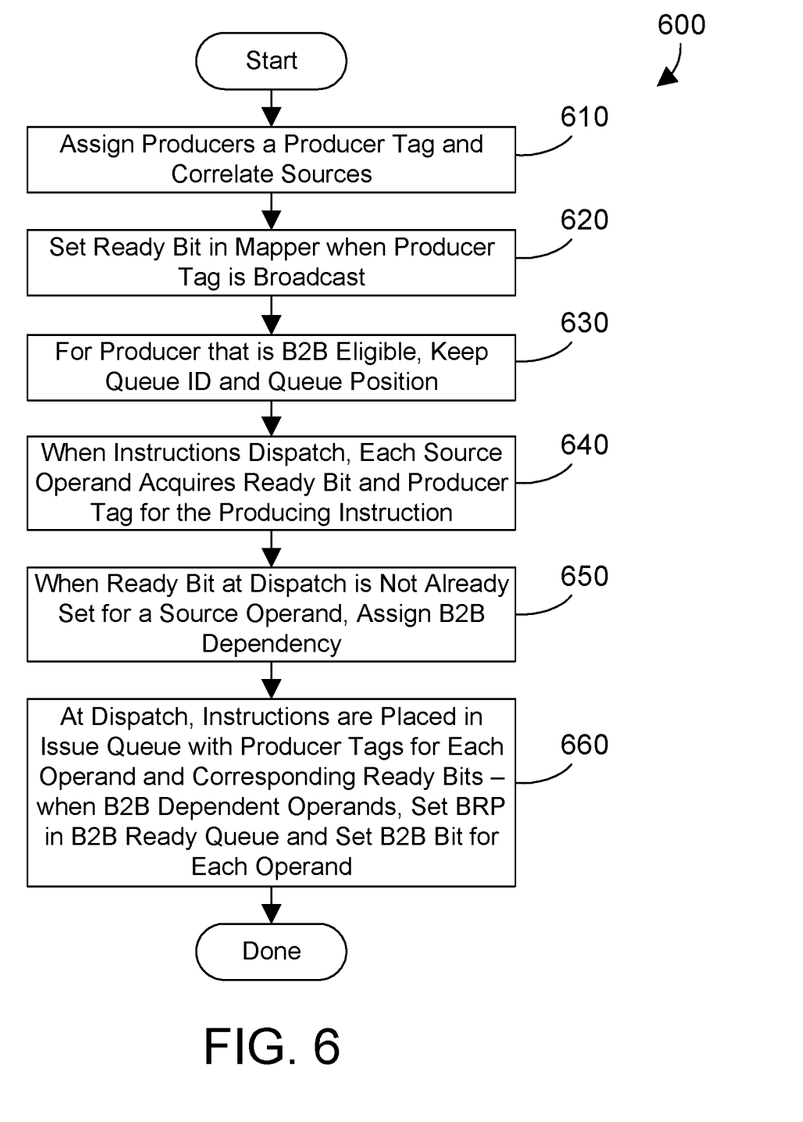
FIG. 6 is a flow diagram of a method for determining and setting dependencies between operands.

Method 600 in FIG. 6 shows specific steps that could be taken in the processor 110 shown in FIG. 5 in accordance with the disclosure and claims herein. Method 600 is preferably performed by the back-to-back dependency assignment mechanism 570 shown in FIG. 5. Instructions are dispatched in-order. The back-to-back dependency assignment mechanism 570 assigns instructions that produce operands a producer tag, and correlates instructions that use the operand as source instructions (step 610). The ready bit in the mapper is set when a producer tag is broadcast (step 620). Producer readiness is tracked at the mapper by snooping the producer tags which are broadcast when results become available and corresponding ready bits are set. The ready bit in the mapper is set once a broadcast is detected. For each producer that is back-to-back eligible, the queue-id and queue position of the issue queue from which they will launch is also kept at dispatch in addition to the broadcast tag (step 630). When instructions dispatch in order, each source operand checks and acquires the ready bit and acquires the producer tag for the producing instruction (step 640). When the ready bit at dispatch is not already set for a source operand, the back-to-back dependency mechanism 570 decides which of the non-ready operands will be assigned a back-to-back dependency (step 650). In order to be chosen, the operand producer must meet certain restrictions, including: must be of appropriate execution length (e.g., one cycle execution); must be originating from a similar issue queue and an execution unit which will be able to provide back-to-back results; and must not exceed the maximum operand tracking capability of the back-to-back ready queue, i.e., if more than one operand is not ready and only one operand will be tracked, then one must be chosen. When a source is chosen it also picks up the queue-id and queue position of the producer itag. At dispatch, instructions are placed in the issue queue with producer tags for each operand and corresponding ready bits acquired from dispatch mapper logic. When back-to-back dependent operands were identified, their corresponding back-to-back-pending (BRP) bit is set in the back-to-back ready queue 550, and a back-to-back bit (e.g., S0-b2b) in the issue queue 510 is set alongside the ready bit (e.g., S0-rdy) for each operand (step 660). Method 600 is then done.

Figure 7:
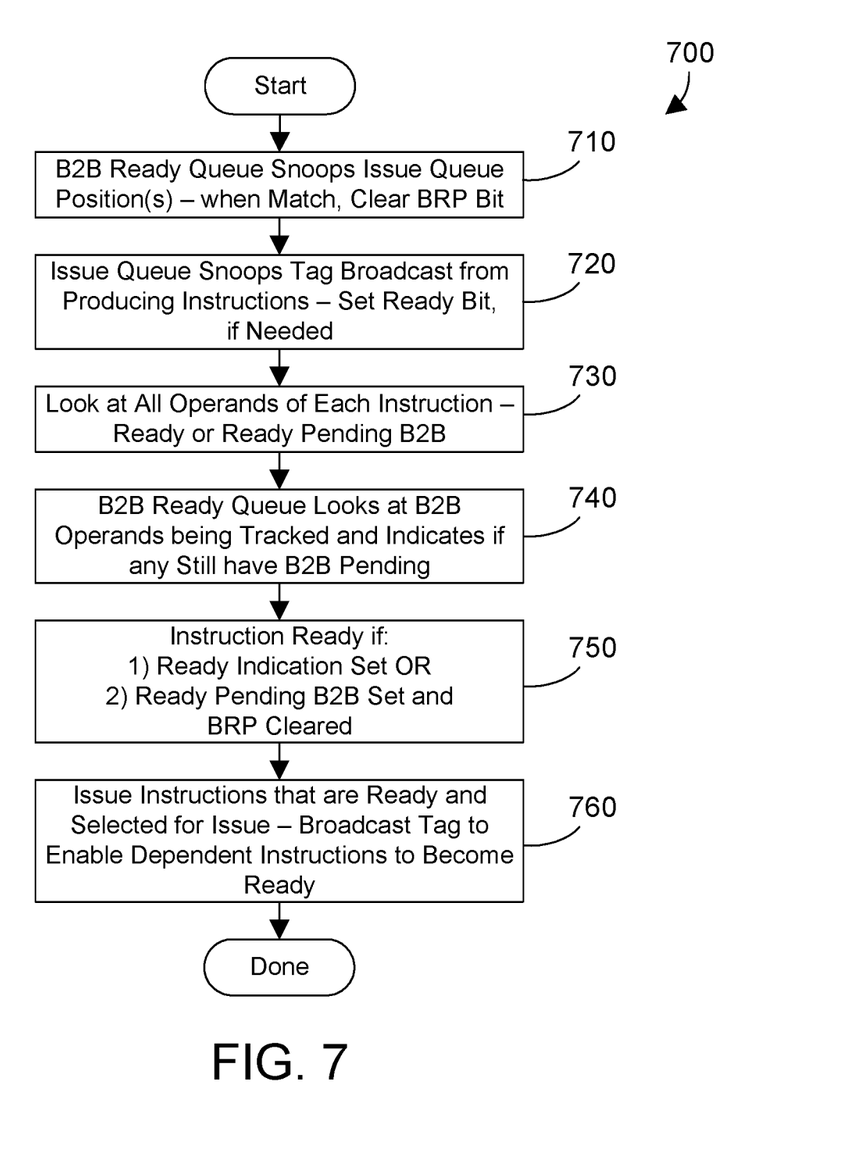
FIG. 7 is a flow diagram of a method to issue instructions even when an instruction may have an operand that is not ready, when the operand is produced in an instruction that is back-to-back with the current instruction that uses the operand.

FIG. 7 shows a method 700 that is preferably performed by the ready logic 112 in processor 110 shown in FIG. 1. The back-to-back ready queue snoops the issue queue position being issued from each eligible issue queue. The issue queues positions (and issue queue id) is compared against the pending issue queue and when there is a match the back-to-back pending bit is cleared (step 710). The issue queue snoops tags broadcast from producing instructions which may be executed from various pipelines. When a tag is snooped, the ready bit is set, if not set already, to correspond with readiness for issue based on the latency of the producing instruction (step 720). The ready logic 520 looks at all operands of each instruction and indicates if the instruction entry is either "ready", or "ready pending back-to-back", where "ready" is indicated by having all ready bits set, and "ready pending back-to-back" is set when for each operand either the ready bit is set or the back-to-back bit is set (step 730). The back-to-back ready queue then looks at all back-to-back operands being tracked and indicates if any still have "back-to-back pending" as indicated by the BRP bit being cleared (step 740). Each instruction entry is considered ready when either the "ready" indication was set by virtue of all operands having their ready bits set, or if the "ready pending back-to-back" indication is set by virtue of having the b2b bits set together with the corresponding BRP indications being cleared (step 750). Instructions issue once they are ready and are selected for issue. (step 760). Issued instructions that are selected from the issue queue have their issue queue index/id snooped and also broadcast their tag to enable dependent instructions to become ready.

Known issue queues use only the queue position in solving operand dependencies between instructions. The disclosure and claims herein, in contrast, maintain the benefits of determining when instructions and operands are ready based on a global tag broadcast, while using queue position to circumvent the global tag broadcast and provide the benefits of back-to-back issue with a minimum of wasted cycles.

An advantage of the processor disclosed herein is an instruction may be marked as ready when not all of its operands are ready, provided that the instruction is back-to-back with an instruction that produces the needed operand that is not ready. This allows more efficiently issuing instructions without empty cycles, thereby improving performance of the processor.

The claims and disclosure herein provide an out-of-order (OOO) processor that includes ready logic that provides a signal indicating an instruction is ready when all operands for the instruction are ready, or when all operands are either ready or are marked back-to-back to a current instruction. By marking a second instruction that consumes an operand as ready when it is back-to-back with a first instruction that produces the operand, but the first instruction has not yet produced the operand, latency due to missed cycles in executing back-to-back instructions is minimized.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A processor for executing software instructions, the processor comprising:
   (A) an issue queue that comprises a plurality of entries, a selected one of the plurality of entries comprising:
      a first instruction that references a first operand;
      first data that indicates when the first operand is ready; and
      second data that indicates when the first operand is not ready but the first instruction can be issued back-to-back to a current instruction that produces an operand used by the first instruction;
   (B) a back-to-back ready queue that comprises a plurality of entries that have a one-to-one correspondence with the plurality of entries in the issue queue, wherein a selected one of the plurality of entries in the back-to-back ready queue that corresponds to the selected one of the plurality of entries in the issue queue comprises:
      third data that indicates for the first instruction an issue queue instance identifier and issue queue entry of a producing instruction and whether the producing instruction is pending;
   (C) a ready logic circuit that receives the first, second and third data and provides a first signal indicating the first instruction is ready when either the first data indicates the first operand is ready or when the second data indicates the first operand is not ready but the first instruction can be issued back-to-back to the current instruction and the third data indicates the producing instruction is not pending; and
   (D) an issue selector that selects the first instruction in the selected one of the plurality of entries in the issue queue to issue when the first signal of the ready logic circuit indicates the first instruction is ready.

2. The processor of claim 1 wherein the first instruction references the first operand using a global tag.

3. The processor of claim 2 wherein the first data indicates the first operand is ready based on a match of the global tag from an issuing instruction.

4. The processor of claim 1 wherein the first instruction references a plurality of operands that includes the first operand, and wherein the ready logic circuit provides the first signal indicating the first instruction is ready when all of the plurality of operands are either ready or the first instruction can be issued back-to-back to the current instruction based on the issue queue instance identifier and the issue queue entry of the producing instruction.

5. A processor for executing software instructions, the processor comprising:
   (A) an issue queue that comprises:
      a first plurality of entries, a selected one of the first plurality of entries comprising:
         an instruction that references at least one operand;
         a global tag for each operand referenced in the instruction that is broadcast to at least one other issue queue;
         a ready bit corresponding to each operand referenced in the instruction, each ready bit indicating whether a corresponding operand is ready for the instruction to issue; and
         a back-to-back bit corresponding to each operand referenced in the instruction, each back-to-back bit indicating whether a corresponding operand has a data dependency on an operand in a different instruction that can issue back-to-back with the instruction;
   (B) a back-to-back ready queue comprising:
      a second plurality of entries that correspond to the first plurality of entries in the issue queue, a selected one of the second plurality of entries that corresponds to the selected one of the first plurality of entries comprising:
         a queue position identifier that identifies a corresponding entry in the issue queue; and
         a back-to-back result pending bit that indicates that the instruction in the corresponding entry in the issue queue is not ready because a producing instruction has not yet been issued;
   (C) a ready logic circuit that receives the ready bit for each operand referenced in the instruction, the back-to-back bit for each operand referenced in the instruction, and the back-to-back result pending bit, and provides a signal indicating the instruction is ready when either of the following is true:
      each ready bit indicates that each corresponding operand referenced in the instruction is ready for the instruction to issue; or
      a first ready bit indicates that a first operand referenced in the instruction is not ready for the instruction to issue and the back-to-back bit corresponding to the first operand is set to indicate a data dependency on the operand in the different instruction that can issue back-to-back with the instruction, and the producing instruction has issued, and all remaining ready bits corresponding to other operands referenced in the instruction other than the first operand indicate that each operand referenced in the instruction other than the first operand is ready for the instruction to issue;

(D) an issue selector that selects the instruction in the selected one of the first plurality of entries to issue when the signal of the ready logic circuit indicates the first instruction is ready.

6. A processor for executing software instructions, the processor comprising:

(A) a plurality of issue queues;

wherein each issue queue comprises a plurality of entries, a selected one of the plurality of entries corresponding to a selected issue queue comprising:

a first instruction that references at least one operand by global tag;

first data corresponding to each operand that indicates the corresponding operand was marked ready based on a global tag match based on a tag broadcast from issuing instructions; and second data corresponding to each operand that indicates the first instruction can be issued back-to-back to a producing instruction, wherein each operand referenced by the first instruction when the first instruction can be issued back-to-back to a producing instruction comprises a back-to-back operand;

(B) a back-to-back ready queue that comprises a plurality of entries that have a one-to-one correspondence with the plurality of entries in the selected issue queue, wherein a selected one of the plurality of entries in the back-to-back ready queue that corresponds to the selected one of the plurality of entries in the selected issue queue comprises:

third data that indicates for a back-to-back operand an issue queue instance identifier of the producing instruction and an issue queue entry of the producing instruction and whether the producing instruction is still pending based on an early queue entry broadcast from issuing instructions;

(C) a ready logic circuit that receives the first and second data and provides a first signal indicating the first instruction is ready pending back-to-back producer resolution and generates a second signal indicating the first instruction is ready to issue based on the first signal and the third data when all corresponding back-to-back producing instructions have issued; and (D) an issue selector that selects the first instruction in the selected one of the plurality of entries in the selected issue queue to issue when the second signal of the ready logic circuit indicates the first instruction is ready and broadcasts a queue position of the selected instruction and subsequently selects and broadcasts a global tag for the selected instruction.

* * * * *